United States Patent [19]

Rinneer

[11] Patent Number: 4,722,672

[45] Date of Patent: Feb. 2, 1988

[54] HYDRAULIC ENERGY-CONVERSION DEVICE

[76] Inventor: Arthur E. Rinneer, P.O. Box 115, Beulah, Mich. 49617

[21] Appl. No.: 795,111

[22] Filed: Nov. 5, 1985

Related U.S. Application Data

[60] Division of Ser. No. 715,369, Mar. 25, 1985, Pat. No. 4,563,137, which is a continuation of Ser. No. 467,216, Feb. 17, 1983, abandoned.

[51] Int. Cl.⁴ .................. F04B 49/02; F04B 49/08; F04C 2/46; F16K 17/04
[52] U.S. Cl. .................... 417/310; 417/311; 418/60; 418/63; 137/529; 137/538
[58] Field of Search .................... 418/60, 63, 102; 137/529, 538; 417/281, 307, 310, 311

[56] References Cited

U.S. PATENT DOCUMENTS

| | | | |
|---|---|---|---|
| 43,204 | 6/1864 | Harrison | 418/66 |
| 1,684,274 | 9/1928 | Hinds | 418/62 |
| 1,969,999 | 8/1934 | Cuthbert | 418/60 |
| 2,743,674 | 5/1956 | Shaw | 417/311 |
| 2,819,729 | 1/1958 | MacGregor | 137/529 |
| 3,150,603 | 9/1964 | Yarger | 417/434 |
| 3,191,403 | 6/1965 | Ladusaw | 418/60 |
| 3,791,780 | 2/1974 | Fritch et al. | 418/60 |
| 3,981,641 | 9/1976 | D'Amato | 418/102 |

Primary Examiner—John J. Vrablik
Attorney, Agent, or Firm—Glenn B. Morse

[57] ABSTRACT

A device capable of functioning as a fluid pump or motor has a related hydraulic circuit controlling the relationship of the case pressure to the pressure in high-pressure port. The arrangement thus limits the operating pressure effective on the seal system. The preferred form incorporates the hydraulic circuit within the body of the device.

4 Claims, 26 Drawing Figures

FIG. I

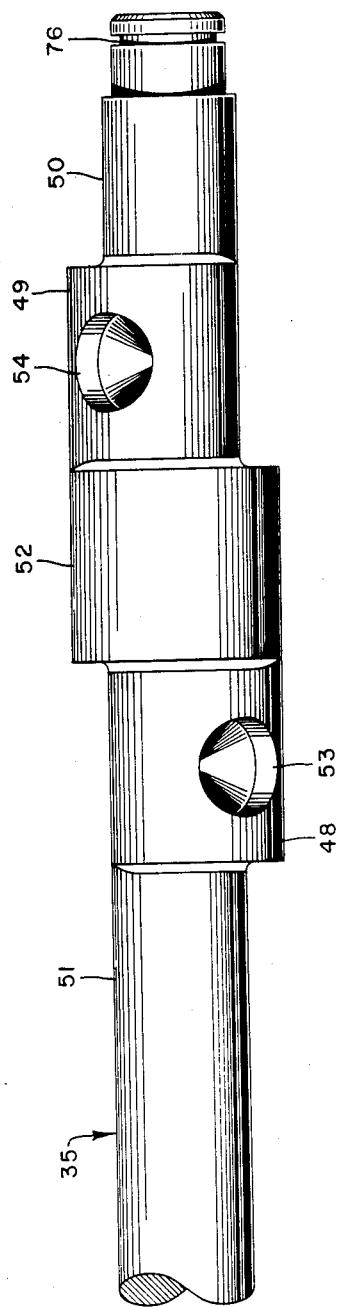
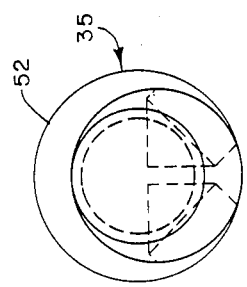
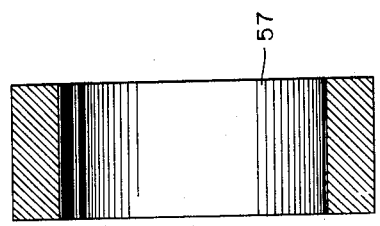
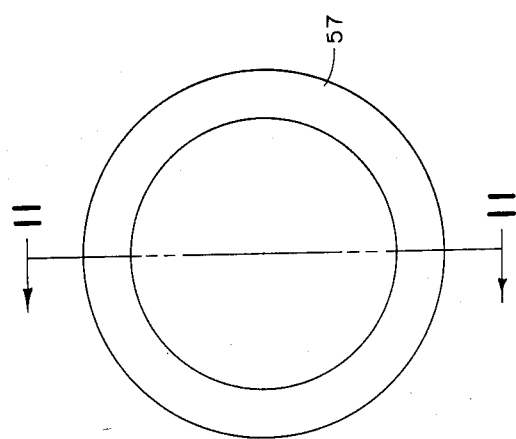
FIG. 8
FIG. 9
FIG. 10
FIG. 11

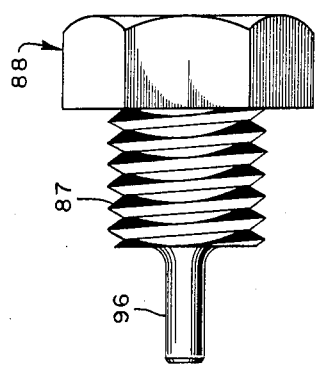
FIG. 15
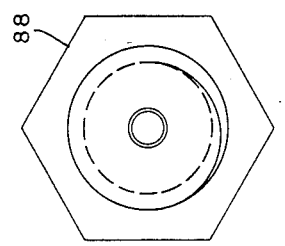
FIG. 16
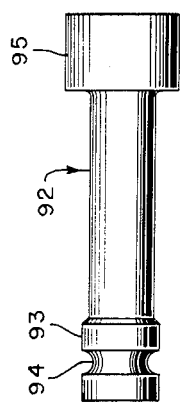
FIG. 13
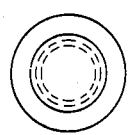
FIG. 14
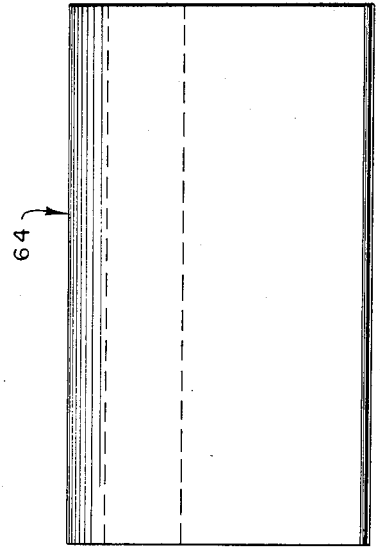
FIG. 17
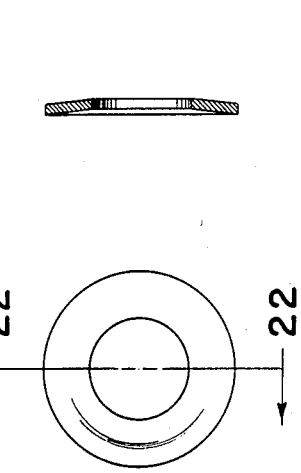
FIG. 22
FIG. 21
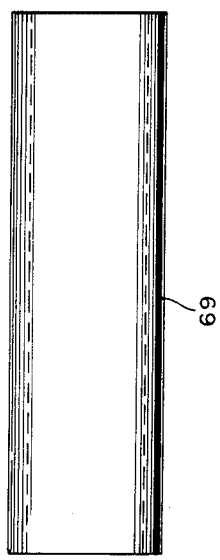
FIG. 18
FIG. 19
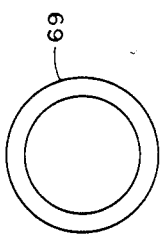
FIG. 20

HYDRAULIC ENERGY-CONVERSION DEVICE

This application is a divisional of application Ser. No. 06/715,369, filed on Mar. 25, 1985, now U.S. Pat. No. 4,563,137 which, in turn, is a continuation of application Ser. No. 06/467,216, filed on Feb. 17, 1983, now abandoned.

BACKGROUND OF THE INVENTION

Hydraulic energy-conversion devices have been in wide use for decades. These are adapted to convert rotary mechanical torque to fluid pressure, and vice-versa. One type of this general class of machine utilizes an eccentric, cam, or crank on the rotatable shaft to induce reciprocating movement of a piston, and another type has a rotor driven by the shaft in an eccentric chamber, with moveable vanes on the rotor controlling the fluid as the shaft rotates. Other types referred to as centrifugal and gear devices are also common, but these are of no interest in connection with the present invention. All of these types have been subject to such intense development that general design details from all manufacturers of each type are closely similar. Performance criteria for comparing these devices include pressure and rotational speed capability, flow volume with respect to overall size, minimum alteration of performance from wear, and relative freedom from vibrations due to mechanical imbalance or pressure pulsations.

SUMMARY OF THE INVENTION

The preferred form of the device illustrated in the drawings has been developed primarily as a fluid pump. This pump has a shaft provided with one or more eccentrics, each of which rotate in an axiallyshort cylindrical chamber coaxial with the shaft. The shaft eccentrics have balancing recesses machined into them, the eccentrics then being surrounded by a continuous cylindrical sleeve forming the inner race of a bearing system interposed between the eccentric and a surrounding ring. The thickness of the ring is approximately equal to the minimum distance from the eccentric (including the bearing system) and the peripheral wall of the cylindrical chamber, so that the ring rolls on this peripheral wall as the shaft rotates.

High and low-pressure ports communicate with the space between the ring and the peripheral wall surface, and a moveable dam forms a continuing seal between the outer surface of the ring and the adjacent surfaces of the chamber to isolate the high pressure from the low pressure spaces. A second moveable dam on the opposite side of the high pressure port from the dam previously referred to prevents back flow during a minor portion of the rotation of the system. In summary, the rotation of the shaft causes the ring to roll about the peripheral wall, and compress fluid ahead of it, the flow being diverted by the moveable seal so that it passes out through the high-pressure port.

A passageway communicates between the portion of the housing adjacent the principal shaft bearings and the low-pressure port, and this passage also communicates with the high-pressure port. A valve system is incorporated in this passage which maintains a pre-determined relationship between the case pressure and the high pressure space to control the loading on the shaft bearings and the seals. Another passageway communicates with the high-pressure port, with an overflow conduit communicating with the low-pressure side of the device. A piston is mounted in this passageway influenced by a combination of the high-pressure and the action of a spring system, so that pulsations, and consequent vibrations, can be effectively suppressed.

The structure of the device is arranged so that the engagement of roller bearings with the eccentric sleeve takes place over a greater axial length than does the engagement of the same rollers with the inside concave surface of the ring. Since the wear conditions are much more severe on the shorter-radius convex surface of the sleeve, the wear conditions are thus equalized.

DESCRIPTION OF THE DRAWINGS

FIG. 3 is on an enlarged scale.

FIGS. 5–22 are on an enlarged scale over FIGS. 1, 2 and 4.

FIG. 6 is a plan view of the right end-plate, with respect to FIG. 1, showing the end shaft bearing in position.

FIG. 7 is a section on the plane 7—7 through the intermediate manifold plate that forms an end barrier to each of the pressure-generating chambers.

FIG. 8 is a side view of the shaft of the device.

FIG. 9 is a end view with respect to FIG. 8.

FIG. 10 is a plan view of the ring surrounding the shaft eccentric.

FIG. 11 is a section on the plane 11—11 of FIG. 10.

FIG. 12 is a view of the system for controlling the relationship between the case pressure and the high-pressure side of the device, shown as a section through the central plate appearing in FIG. 7.

FIG. 13 is a side elevation of the piston appearing in FIG. 12.

FIG. 14 is an end view with respect to FIG. 13.

FIG. 15 is a side elevation of the closure plug shown in FIG. 12.

FIG. 16 is an end view with respect to FIG. 15.

FIG. 17 is an end view of the moveable sealing dam.

FIG. 18 is a side view with respect to FIG. 17.

FIG. 19 is a side view of the tubular dam member forming the momentary seal blocking back flow from the pressure port.

FIG. 20 is an end view with respect to FIG. 19.

FIG. 21 is a view of one of the conical spring washers.

FIG. 22 is an axial section through the washer shown in FIG. 21.

DESCRIPTION OF THE PREFERRED EMBODIMENT

Figure 1:
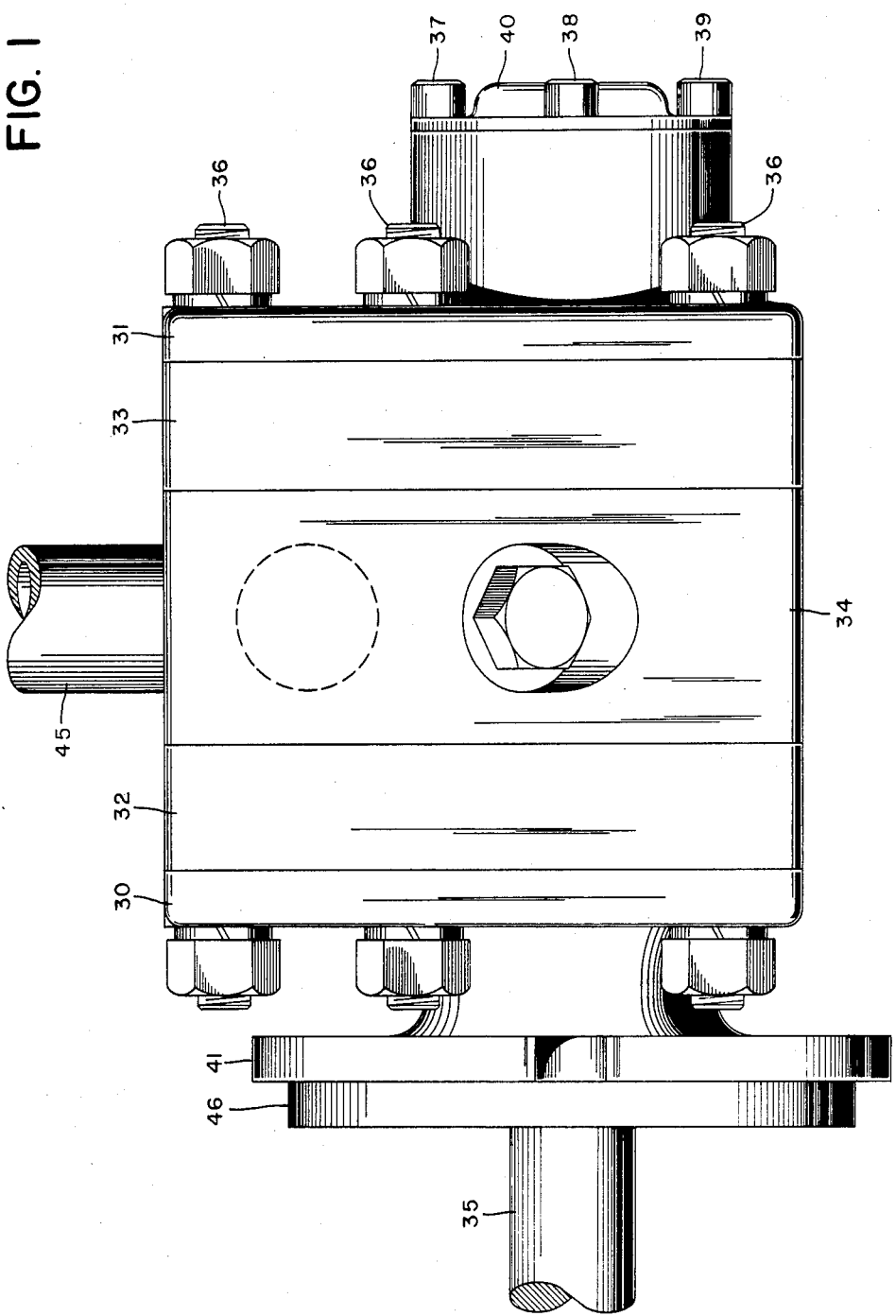
FIG. 1 is an exterior side elevation of the two-stage fluid pump illustrated in the remainder of the views.
Figure 2:
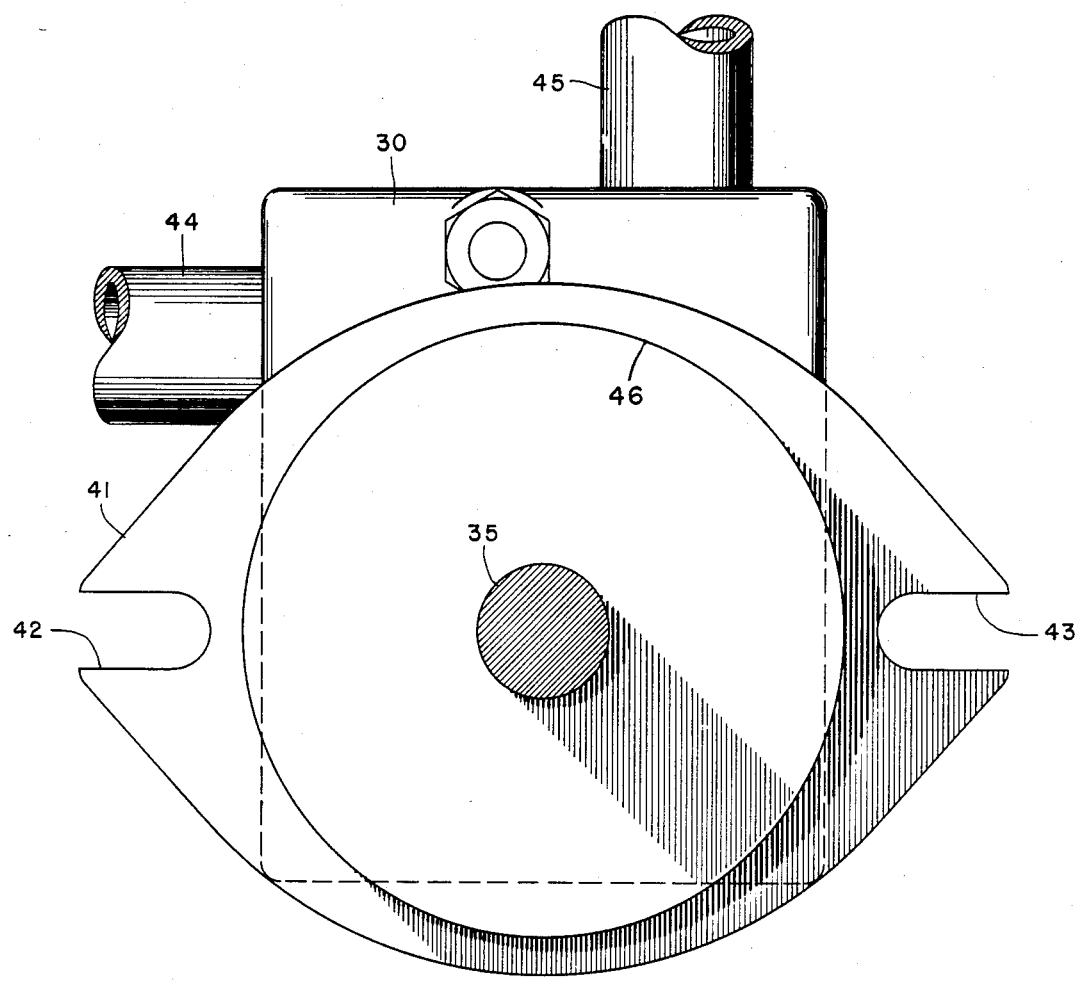
FIG. 2 is a left end view of the device, with respect to FIG. 1.

Referring to the drawings, the device shown in FIG. 1 includes the end members 30 and 31, the compression chamber members 32 and 33, the central partition and manifold member 34, and the shaft 35. This assembly is held together by a series of bolts indicated generally at 36 extending through these components parallel to the axis of the shaft 35. The screws shown at 37-39 in FIG. 1 hold the bearing cap 40 in position. Referring to FIG. 2, the flange 41 of the end member 30 is interrupted as shown at 42 and 43 to receive mounting bolts (not shown) associating the fluid pump with the equipment on which it may be mounted. The conduits 44 and 45 are the high pressure and low pressure lines, respectively, extending from the pump to the equipment which it serves (not shown). The locating shoulder 46 is customarily provided for assuring proper relative alignment.

Figure 3:
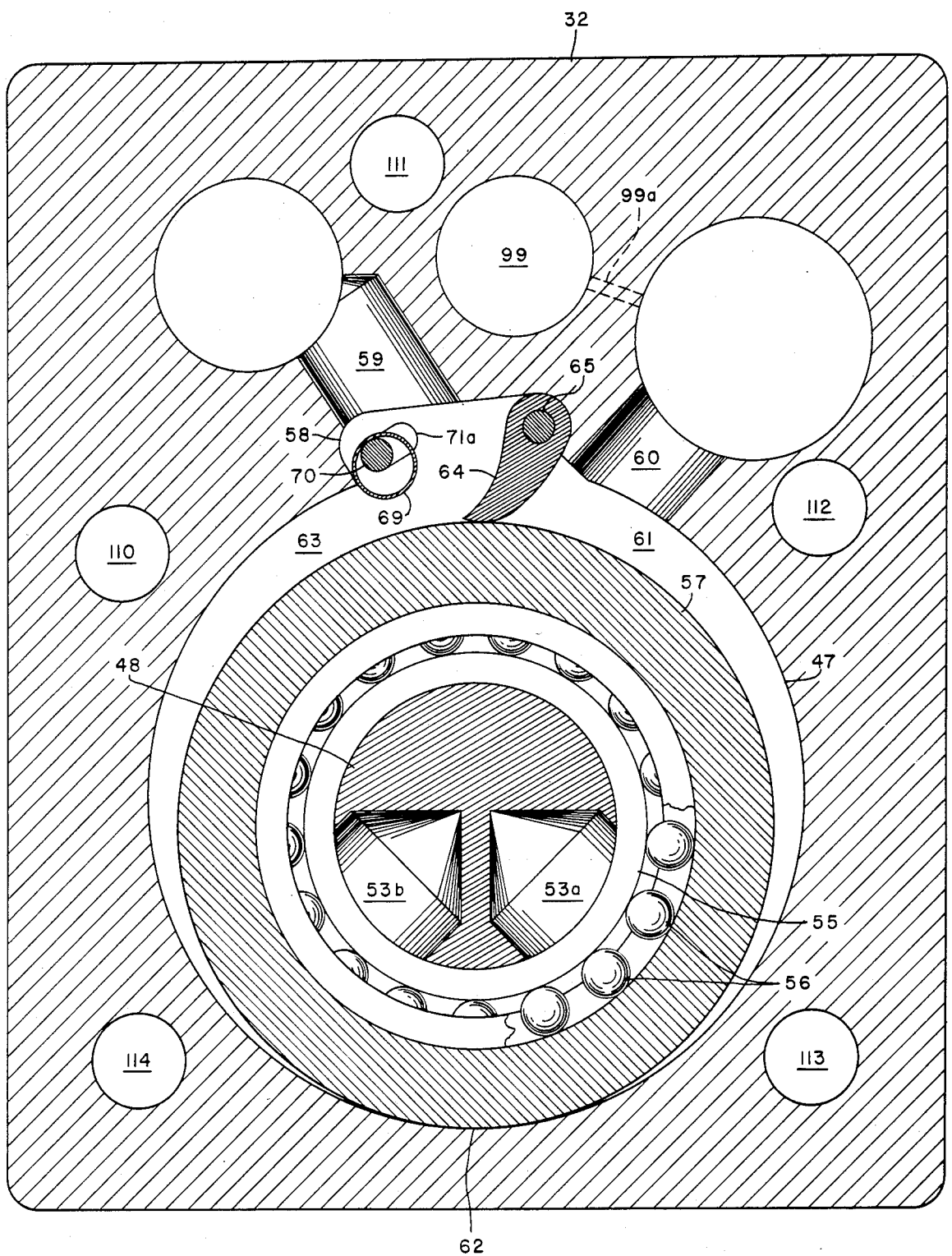
FIG. 3 is a sectional elevation on a plane perpendicular to the axis of the device, taken through one of the pressure-generating chambers.

FIG. 3 illustrates the principal components responsible for generating the fluid pressure. The plates 32 and 33 are the same, and each define the cylindrical wall 47 of a pressure chamber coaxial with the shaft 35. The shaft 35 (refer to FIGS. 8 and 9) has a pair of eccentrics indicated at 48 and 49 machined as an intregal part with the axial end sections 50 and 51. The central portion 52 forms a journal for the central bearing support of the shaft, and is of sufficient diameter so that a standard bearing can be slipped axially along the shaft into position. The eccentrics 48 and 49 have recesses shown at 53 and 54 machined into them for the removal of sufficient material to balance the eccentrics both statically dynamically with respect to each other, possibly also including the effects of the masses carried by the eccentrics.

A hardened sleeve 55 is pressed into position over the eccentrics to form the inner bearing race for the roller bearings 56 interposed between the sleeve 55 and the ring 57. This ring is shown in detail in FIGS. 10 and 11. The ring is continually pressed by the shaft and the bearing system against the peripheral wall 47 of the pressure-generating chamber. As the shaft rotates, the ring will roll along the surface 47 to induce a relative rotation of the ring 57 with respect to the plate 32 opposite to the direction of rotation of the shaft 35. The discontinuity of the peripheral wall 47 indicated at 58 forms an auxiliary chamber communicating with the pressure port 59. Since the auxiliary chamber 58 extends axially for the thickness of the plate 32, it can be utilized in the assembly of the ring 57 into the chamber, which would otherwise be difficult because of the compression of the ring between the bearings and the peripheral wall 47. The ring can be displaced to a very slight degree into the discontinuity 58 so that the ring 57 does not have to be forced into its assembled position.

As the shaft rotates in a clockwise direction as shown in FIG. 3, liquid enters through the low-pressure port 60 into the space indicated at 61. The clockwise movement of the point of contact 62 compresses the liquid in the space shown at 63, from which it is forced out through the auxiliary chamber 58 into the high-pressure port 59. The moveable sealing dam 64 separates the high and low pressure spaces so that this action can take place. This dam is in the configuration of a flap pivoted on the pin 65 suspended between the end plate 30 and the central partition member 34. For convenience, the members 30-34 shown in FIG. 1 may be referred to as the "housing", functioning as a frame supporting the moving components. The sealing dam 64 is shown in detail in FIGS. 17 and 18, and it should be noted that the semicylindrical surface 66 mates with the similar surface 67 of the plate 32 for the effective support of the sealing dam independently of the pin 65 against the tremendous pressures involved, which will frequently exceed five thousand pounds per square inch. The placement of the pin 65, and the degree of clearance between it and the bore 68 of the sealing dam assures that the principal loading will be born by the cylindrical surfaces. It should be noted that the clockwise rotation of the shaft appearing in FIG. 3 induces the counterclockwise rotation of the ring 57, resulting in preventing any tendency for friction to jam the sealing dam 64 against the ring. The freedom of rotation of the sealing dam 64 about the axis of the pin 65 (and also against the cylindrical support surface) is sufficient to maintain the sealng dam in contact with the periphery of the ring 57 at all times.

A second moveable dam is formed by the tubular member 69 shown in detail in FIGS. 19 and 20. This member is loosely mounted on the pin 70, which is also suspended between the end plate and the central partition member. As the point of contact shown in 62 proceeds around to the chamber discontinuity 58, the tubular member 69 will be riding on the periphery of the ring 57, and will prevent any tendency for high-pressure in the port to flow back into the space shown at 63. This condition persists until the rolling seal provided by the ring 57 clears the inlet port. The thickness of the chamber plates 32 and 33, the axial length of the rings 57, and of the moveable dams 64 and 69 can be controlled to great accuracy with standard grinding procedures, with the net result that the fits between these surfaces are controlled with sufficient accuracy to control leakage. To assure equal pressure on the inside and outside of the tubular dam 69 to avoid collapse, a groove shown at 71a is machined in the central partition plate to communicate between the interior of the tubular member 69 and its exterior. A similar groove 71b is formed in the end plates.

Figure 4:
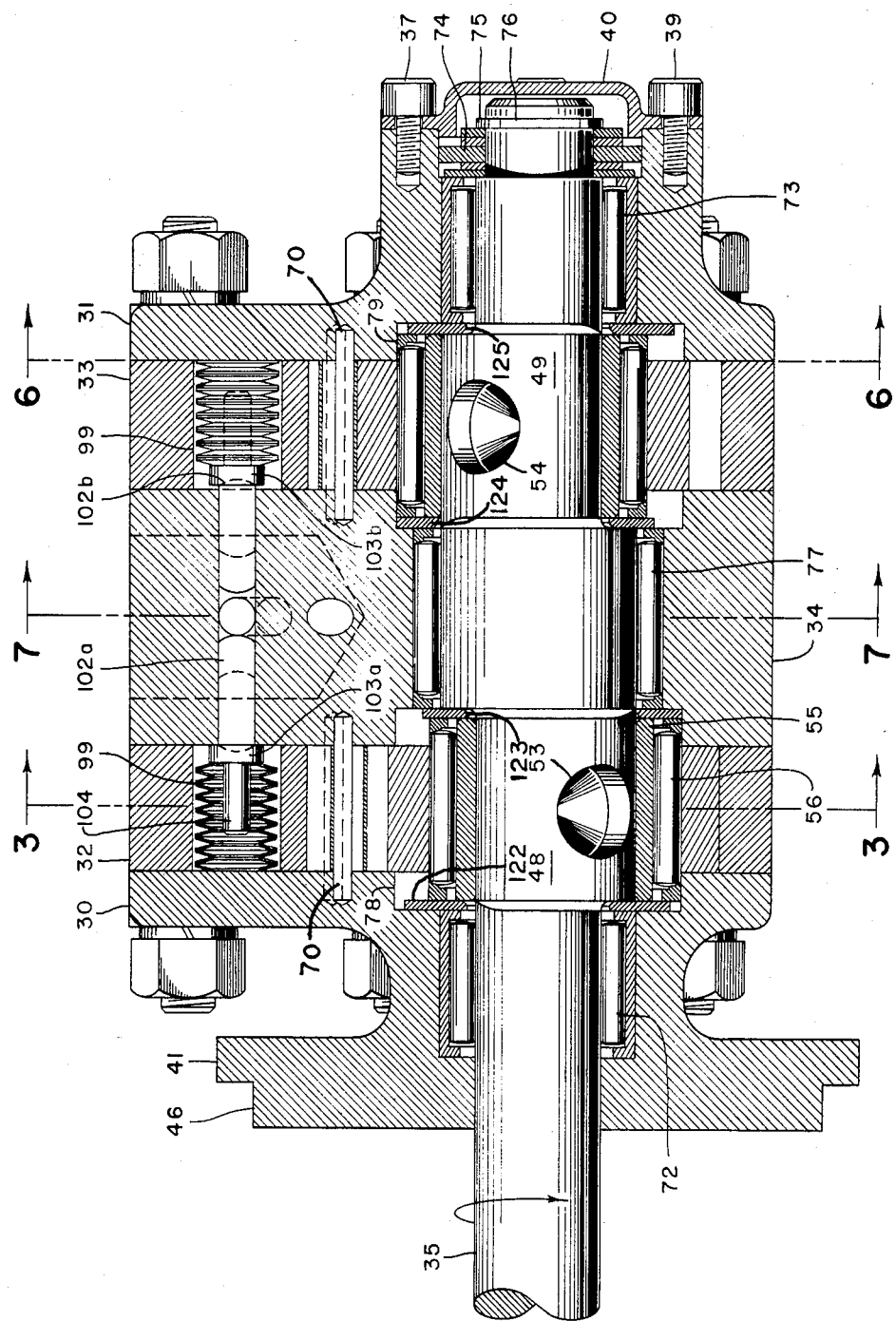
FIG. 4 is an axial section through the fluid motor.

The bearing system transferring the pressure forces to the shaft, and supporting the shaft in the housing, should be noted in some further detail. The end members 30 and 31 provide recesses accommodating the roller bearing systems 72 and 73, respectively, and a thrust bearing assembly 74 is provided under the cap 40. This is retained in position by the snap ring 75 received in the groove 76 of the shaft 35. The conventional bearing indicated at 77 supports the central portion of the shaft. Referring to FIG. 4, it should be noted that the sleeves 55 surrounding the eccentrics extend for substantially the full axial length of the eccentrics, which is a distance considerably greater than the thickness of the pressure-generating rings 57. This results in a transfer of bearing forces to the sleeves over a surface of considerably greater extent than the area provided for the engagement of the rollers with the inside of the rings. This relationship tends to equalize the vulnerability of the components to wear over extended periods, as the most vulnerable surface is the outside of the sleeve, which is of relatively greater curvature, and is convex. The amount of local deflection under load tends to produce greater deformity of the material as the roller passes than is the case where the rollers engage the concave surface of the inside of the ring in a configuration of less curvature. The end members 30 and 31, and the central partition member 34, have counterbored recesses as shown at 78 and 79, respectively, providing a chamber in which the rollers overhang the ends of the rings to give this effect of stress equalization.

The basic pressure-generating system that has been described to this point is illustrated by the schematic views appearing in Figures 23-26. In these views, the bearing systems have been eliminated, so that the ring 57 appears as a larger roller 79 rotatable about the eccentric 81. To illustrate the back-rotation of the ring (or the roller 79), a mark shown at 82 has been arbitrarily inscribed on the roller 79. As the shaft rotates in the direction of the arrow, the roller 79 proceeds to rotate in the direction of the outer arrow, which is in the opposite direction. This produces a movement of the mark 82 in a counterclockwise direction, and at a very slow rate resulting from the planetary relationship. Extremely high-velocity rotations of the shaft therefor translate into very low velocity rolling movement between the periphery of the roller 79 and the inside cylindrical wall 47. This obviously produces very favorable conditions for the reduction of wear, and the only reciprocating movements are the very minor ones associated with the dams 64 and 69.

Figure 12:
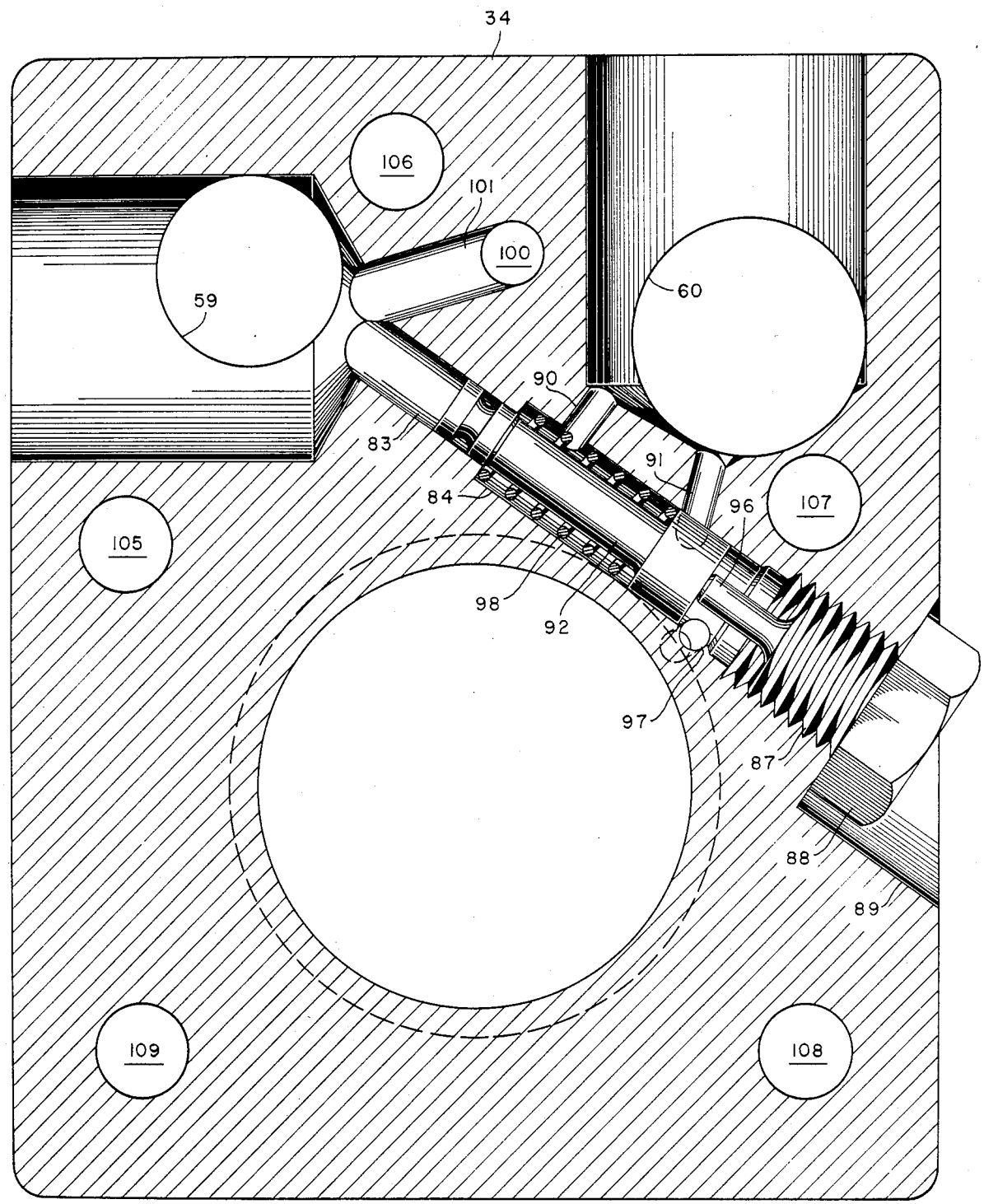
Figure 23:
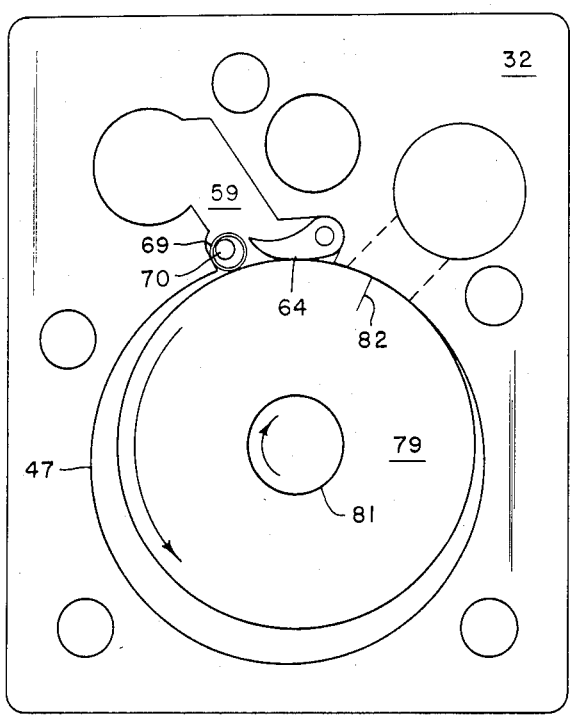
FIGS. 23 through 26 are schematic views illustrating successive positions taken by the components of the machine during a single rotation of the shaft.
Figure 24:
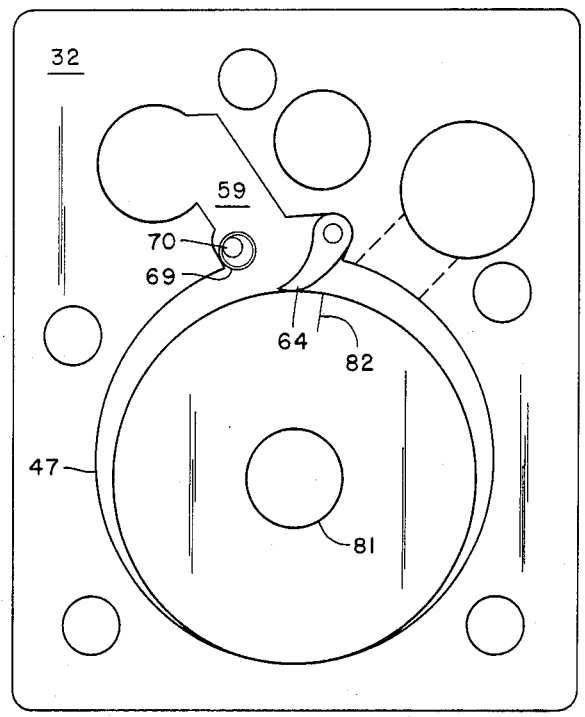
Figure 25:
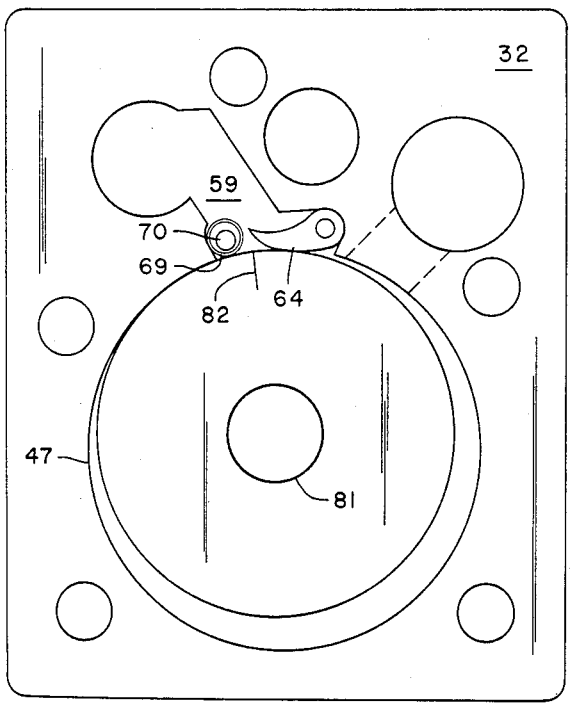
Figure 26:
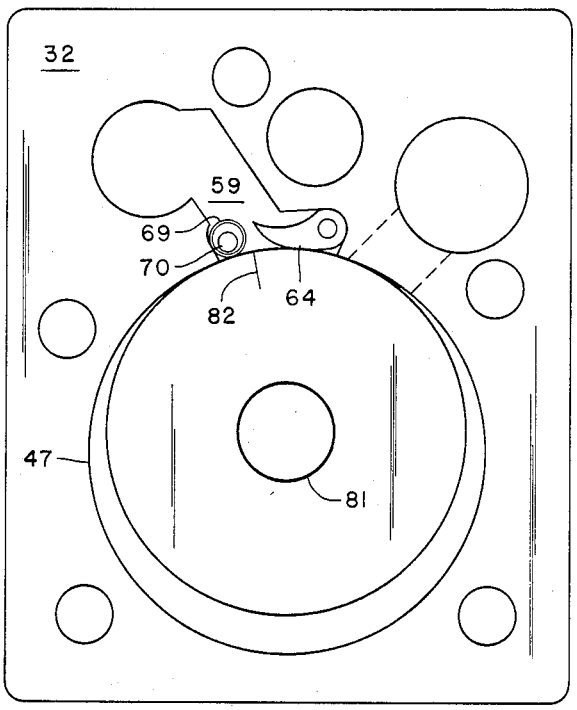

Referring to FIGS. 7, 12, and 14-16, a system is incorporated in the device for controlling the relationship between the case pressure adjacent the shaft bearings and the high-pressure side of the hydraulic system. A control passage in the central partition member 34 has a section 83 of relatively small diameter, and a section 84 of relatively larger diameter. The section 83 communicates with the high-pressure port 59 and the opening 85 receiving the high-pressure line 44. The bore providing these two passage sections has a threaded outer section 86 accommodating the threaded portion 87 of the closure plug 88. The head of this plug is received in the counterbored area 89. The larger portion 84 of the control passage is associated with the low-pressure side of the system by the smaller conduits 90 and 91. Referring to FIGS. 12, 13, and 14, a piston 92 has a small end 93 in sliding engagement with the small-diameter portion 83 of the control passage. A groove 94 is provided for receiving a conventional "O" ring. The opposite end 95 of the piston slides within the larger-diameter portion 84 of the control passage, and is limited in its movement to the right in FIG. 12 by the presence of the stop projection 96 on the closure plug 88. In this position, the portion 95 of the piston closes off the conduit 91. The function of the conduit 90 is to maintain the space in the large portion of the passage 84 to the left of the portion 95 of the piston at low pressure, in order to permit the leftward movement of the piston. A detector conduit 97 communicates with the large-diameter portion 84 of the control passage, and with the space adjacent the main shaft at the central bearing. The function of the stop 96 is to limit the movement of the piston to the right at a position where the end of the piston is at all times exposed to the pressure provided through the detector conduit 97.

As the pump begins its operation, the components are in the position illustrated in FIG. 12. As the case pressure builds up, it is communicated through the detector passage 97 to the large end of the piston 92, and eventually builds up to the point where case pressure over the larger end area of the piston overpowers the action of the spring 98 and the high pressure over the smaller end of the piston, and induces a leftward movement of the piston sufficient to uncover the conduit 91. At this point, the case pressure is vented to the low pressure side of the system. The intensity of the force delivered by the spring 98 determines a threshold pressure differential between the case and the high pressure of the system. The ratio between the diameters of the portions 83 and 84 of the control passage is the primary relationship determining the case pressure differential.

Figure 5:
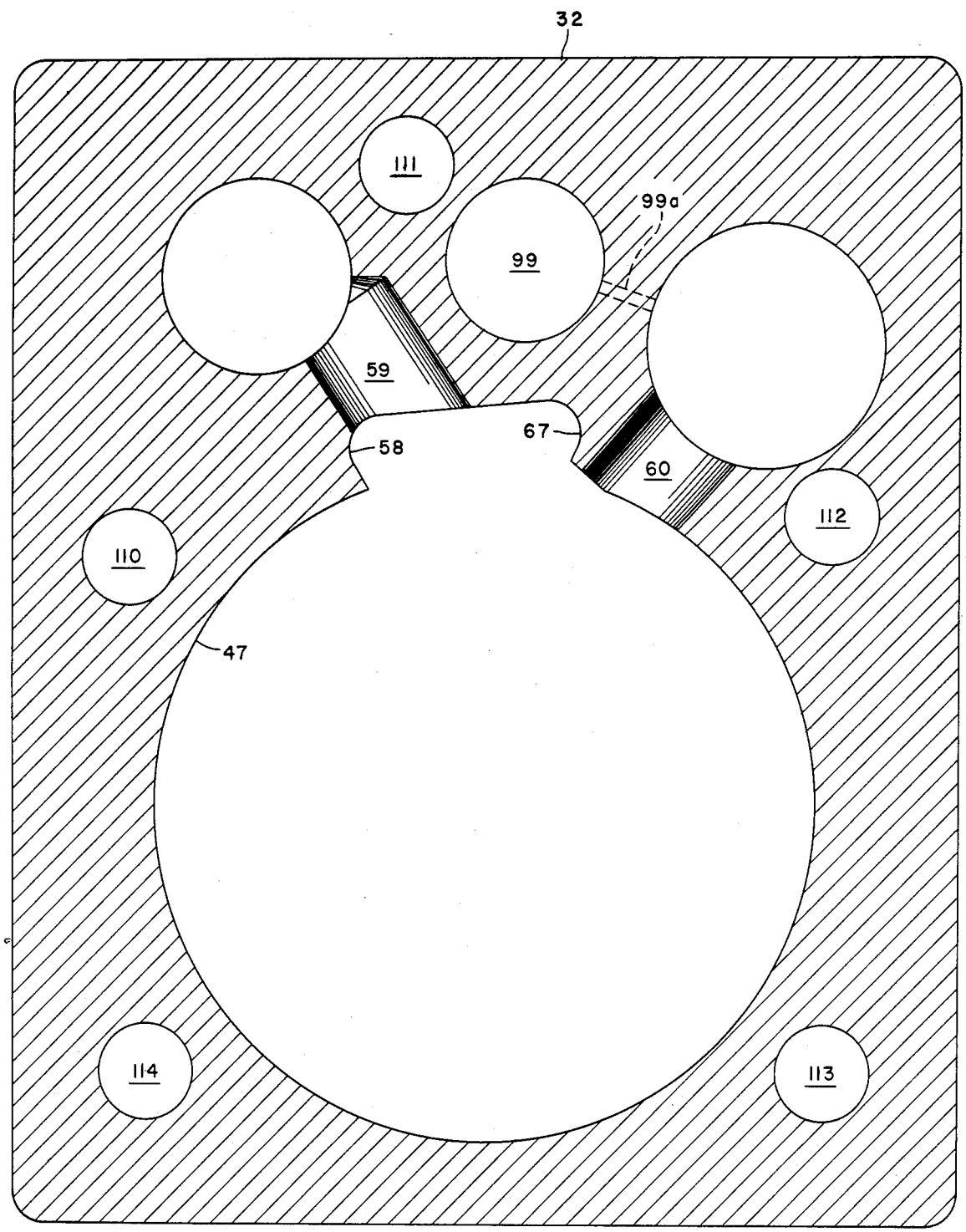
FIG. 5 is a plan view (perpendicular to the axis of the device) of one of the plates defining a pressure-generating chamber.
Figure 6:
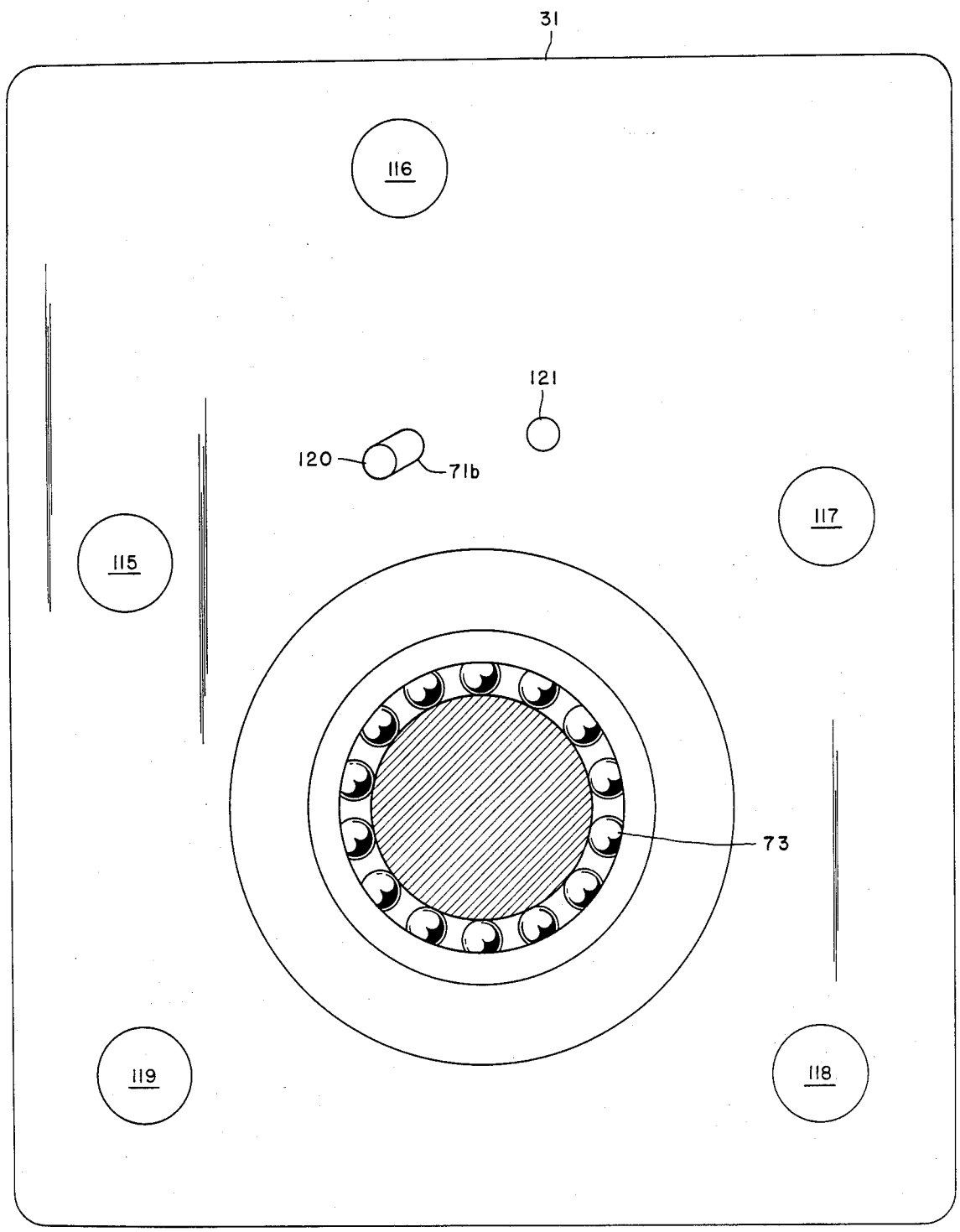
Figure 7:
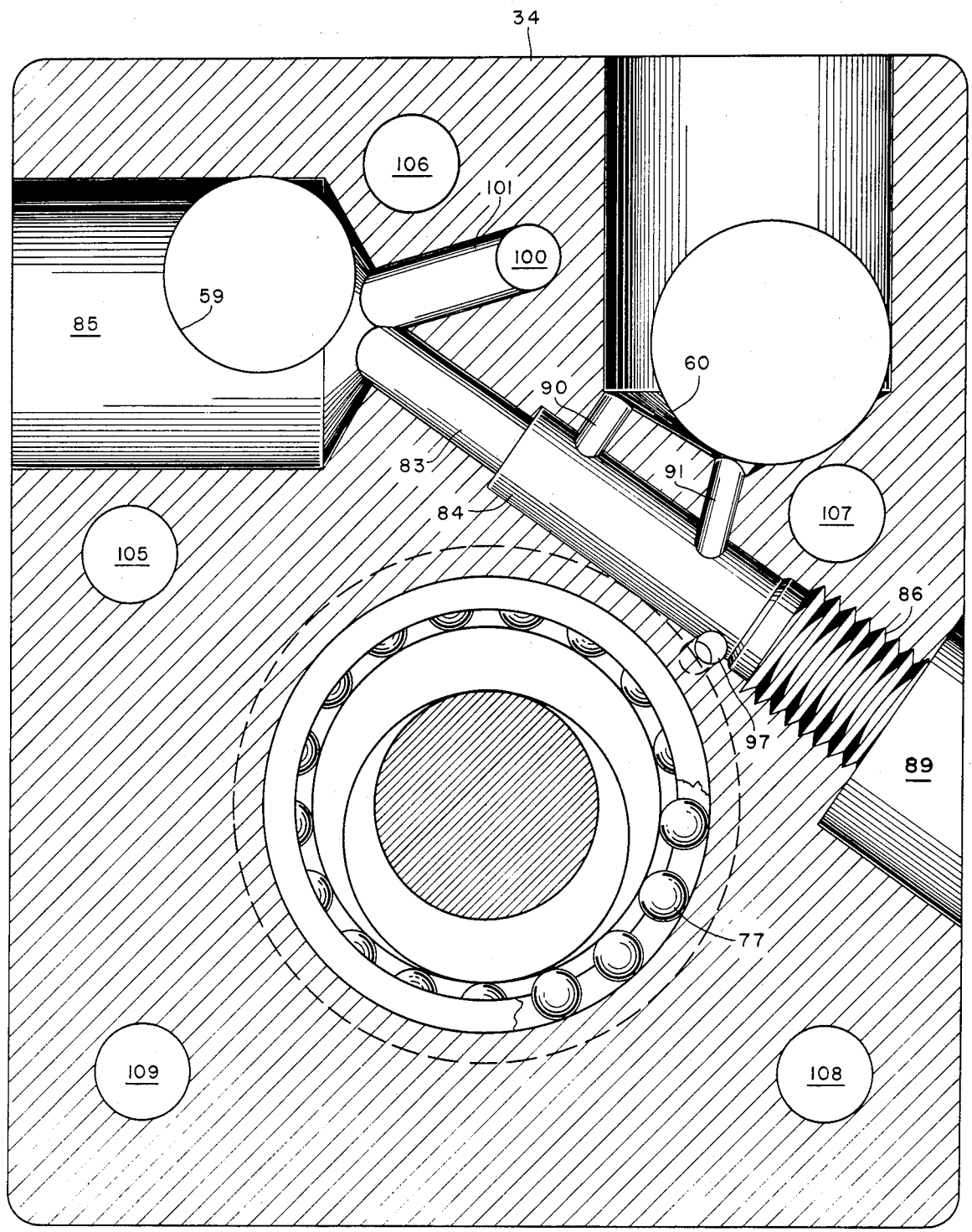

The pump is also provided with a system for suppressing pulsations in the fluid pressure which would otherwise induce objectionable vibrations. Referring to FIGS. 4 and 5, the plates 32 and 33 providing the compression chambers have cylindrical openings 99 parallel to the shaft axis, and the central partition member 34 has a hole 100 of smaller diameter and coaxial with these openings (refer to FIG. 12). A lateral hole 101 communicates between the hole 100 and the high-pressure space 85. The pistons 102 are slideably received in the opposite ends of the hole 100, and are limited in their penetration into this hole by the shoulders 103. The opposite ends of the pistons 102, indicated at 104 in FIG. 4, interengage with the central openings in the standard cone washers loosely received in the openings 99. These washers are arranged in pairs, with each pair consisting of oppositely facing washers that provide considerable axial resilience when stacked as shown in FIG. 4. The result of this arrangement is to cause the pistons 102 to respond to surges of pressure in the high-pressure side of the system, and to move against the action of the stacked spring washers to reduce the intensity of the pressure surges. The openings 99 are drained by passages as shown at 99a in FIG. 5 extending to the low-pressure side of the system.

It should be noted in passing that the bolts 36 responsible for resisting the mechanical and pressures forces are also responsible for the axial alignment of the components to very close tolerances. These bolts are preferably in the form of hardened steel dowel rods threaded at both ends. These special bolts are received in the holes 105-109 in the central partition member, in the holes 110-114 in the pressure-chamber members 32 and 33, and in the holes 115-119 in the end members. The end members also are provided with the holes 120 for receiving one of the ends of the pins 70, and with the holes 121 for receiving one end of the pins 65. Similar holes aligned with these are provided in the central partition plate, but do not appear on the section planes illustrated in the drawings.

The requirement for maintenance of close running fits within the pump dictates that tolerances be kept to a practical minimum. One arrangement for reducing the degree of this problem centers in the washers 122-125 at the opposite ends of the bearings. These washers are to be selected for thickness on assembly to compensate for accumulations in tolerance in the various parts of the pump as manufactured. A very significant characteristic of this pump is its ability to maintain its original tolerances with continued severe usage at high pressure and speed of rotation. The grandual back-rotation of the ring 57 presents excellent wear conditions at the transverse plate surfaces due to the low linear velocities involved, and the continuing changes in relative surface positions. This tends to prevent the erosion of the parts to form leakage channels, and maintains a constant film of lubrication. The absence of heavy inertial forces from reciprocation facilitates the maintenance of the film and is largely responsible for the relatively low stresses on the components for a given pressure and flow volume.

I claim:

1. A rotary hydraulic device including a housing having a rotor chamber provided with relatively high and low-pressure ports, and a rotor and valve system within said chamber adapted to induce a pressure differential between said ports, said housing having bearings supporting said rotor, wherein the improvement improvement is a case-pressuring control system comprising:

means forming a control passage in said housing and having portions of relatively larger and smaller diameters, said portion of relatively smaller diameter communicating with said high-pressure port;

a valve piston having portions in sealing engagement with said larger and smaller diameter portions, respectively;

means forming a detector conduit communicating between (a) said larger diameter portion of said control passage at a position at all times beyond the end of said valve piston, and (b) space adjacent the axis of said rotor;

means forming a conduit in said housing communicating between said low-pressure port and said portion of larger diameter, said valve piston being adapted to move between a position in which said larger diameter sealing portion covers said last-specified conduit, and a position toward said portion of smaller diameter and exposing said last-specified conduit; and means forming an equalization passage communicating between said low-pressure port and said control passage portion of larger diameter, on the side of said valve piston sealing portion toward said portion of smaller diameter in all positions of said valve piston.

2. A device as defined in claim 1, additionally including biasing means urging said valve piston toward the first-specified postion thereof.

3. An hydraulic energy-conversion device, comprising;

a housing having a chamber defined by a cylindrical peripheral surface and opposite end surfaces, said housing including opposite end members providing bearing support for said shaft, and also includes a central partition member defining certain of said end surfaces, said housing also including a pair of chamber members disposed on opposite sides of said central partition member, said central and chamber members being in the form of apertured flat plates, said housing also including a plurality of bolts disposed parallel to said shaft and traversing said end, central, and chamber members;

a shaft rotatably mounted in said housing for rotation coaxially with said cylindrical surface, said shaft having an eccentric portion disposed between said end surfaces;

a ring surrounding said eccentric portion, and interposed between said eccentric and said peripheral surface in close relationship;

means forming relatively high-pressure and low-pressure ports in said housing communicating with said chamber;

a first dam moveably mounted in said housing between said ports, and adapted to close off the cross-section of the portion of said chamber between said ring and said peripheral surface in all positions of said ring;

a second dam moveably mounted in said housing and adapted to close off the cross-section of said chamber between said ring and said peripheral surface in response to an excess of pressure in said high-pressure port over the pressure in the adjacent portion of said chamber, said second dam being disposed on the opposite side of said high-pressure port from said first dam;

means forming a control passage in said central member and having portions of relatively larger and smaller diameters, said portion of relatively smaller diameter communicating with said high-pressure port;

a valve piston received in said control passage, and having portions in sealing engagement with said portions of larger and smaller diameters, respectively;

means forming a detector conduit communicating between said large-diameter control passage portion and the space adjacent said shaft, said detector conduit being disposed to communicate with the large-diameter end of said piston in all positions thereof;

means forming a conduit communicating between said low-pressure port and said portion of larger diameter, said valve piston being adapted to move between a position in which said larger diameter sealing portion covers said last-specified conduit, and a position toward said portion of small diameter and exposing said last-specified conduit; and means forming an equalization passage communicating between said low-pressure port and said control passage portion of larger diameter, on the side of said valve piston sealing portion toward said portion of smaller diameter, in all positions of said valve piston.

4. A device as defined in claim 3, additionally including biasing means urging said valve piston toward the first-specified position thereof.

* * * * *